United States Patent

Elliott et al.

[15] 3,675,041

[45]

[54] REGENERATION CONTROL AND TIMER SYSTEM

[72] Inventors: Eugene R. Elliott; Lehner C. Freborg, both of Libertyville, Ill.

[73] Assignee: Culligan International Company, Northbrook, Ill.

[22] Filed: Dec. 28, 1970

[21] Appl. No.: 101,601

[52] U.S. Cl. .................................. 307/141, 62/157, 200/21
[51] Int. Cl. ......................................................... H01h 43/00
[58] Field of Search ................. 62/156, 157; 307/141, 141.4; 200/21

[56] References Cited

UNITED STATES PATENTS

| | | | |
|---|---|---|---|
| 2,730,336 | 1/1956 | Shiers | 62/157 X |
| 2,744,390 | 5/1956 | Partsch | 62/157 X |
| 3,232,064 | 2/1966 | Murphy et al. | 62/157 X |
| 3,300,990 | 1/1967 | Jaremus | 62/157 X |
| 3,365,582 | 1/1968 | Mellinger | 307/141 |

*Primary Examiner*—Robert K. Schaefer
*Assistant Examiner*—William J. Smith
*Attorney*—Hill, Sherman, Meroni, Gross & Simpson

[57] ABSTRACT

A regeneration control and timer system for one or two water softening or conditioning units to provide for regeneration of the softening material when it has become exhausted, with each water softening unit containing a sensor for indicating the stage of exhaustion of the material and actuating a timer for initiating a regeneration cycle. A timer clock is also present for utilization if the sensor is inoperable and the control contains a shiftable lever and a switch to change from sensor to clock operation. Also, the control system provides for duplexing of the timers and sensors of two water softeners using only a pair of connecting wires so that only one of the two softeners will be regenerated at a time even though both softeners reach the point of exhaustion at substantially the same time.

14 Claims, 7 Drawing Figures

PATENTED JUL 4 1972

Inventors
Eugene R. Elliott
Lehrer C. Freborg
by Wilson & Geppert
Atty's

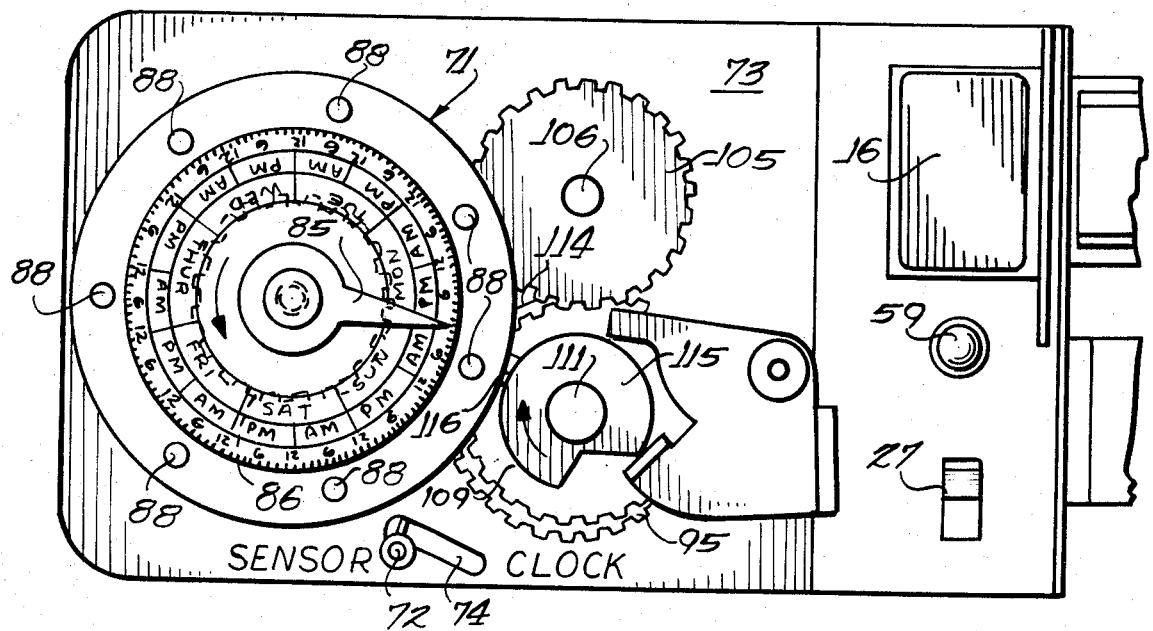
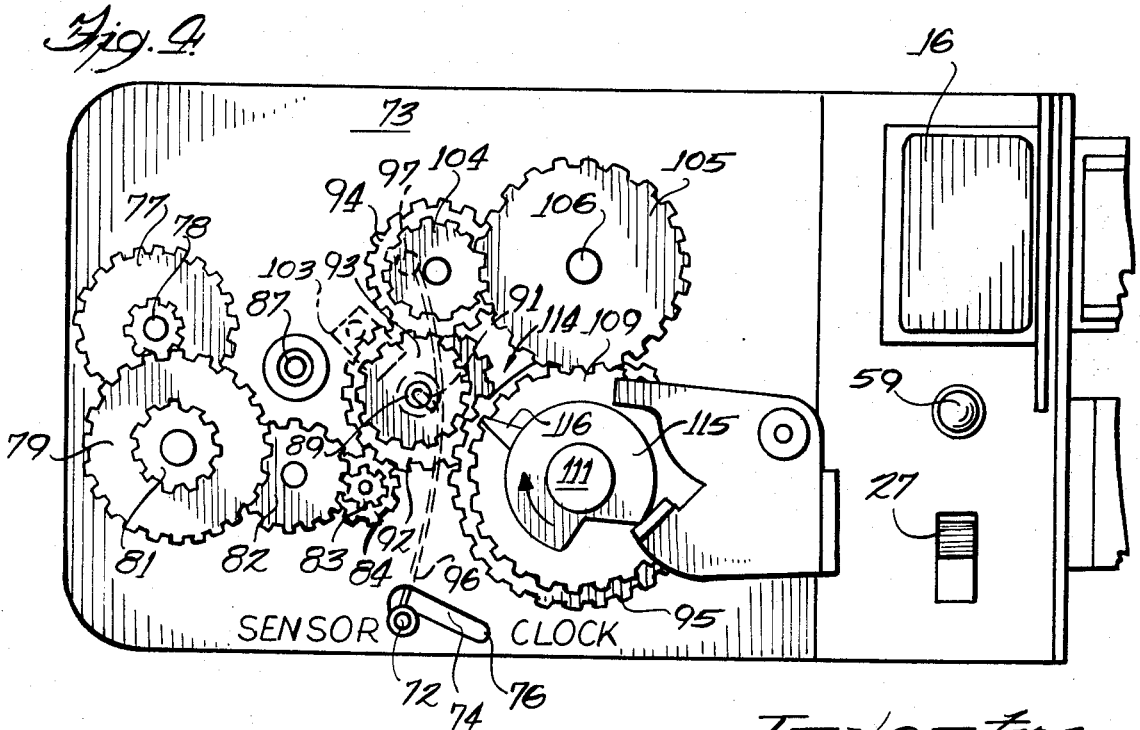

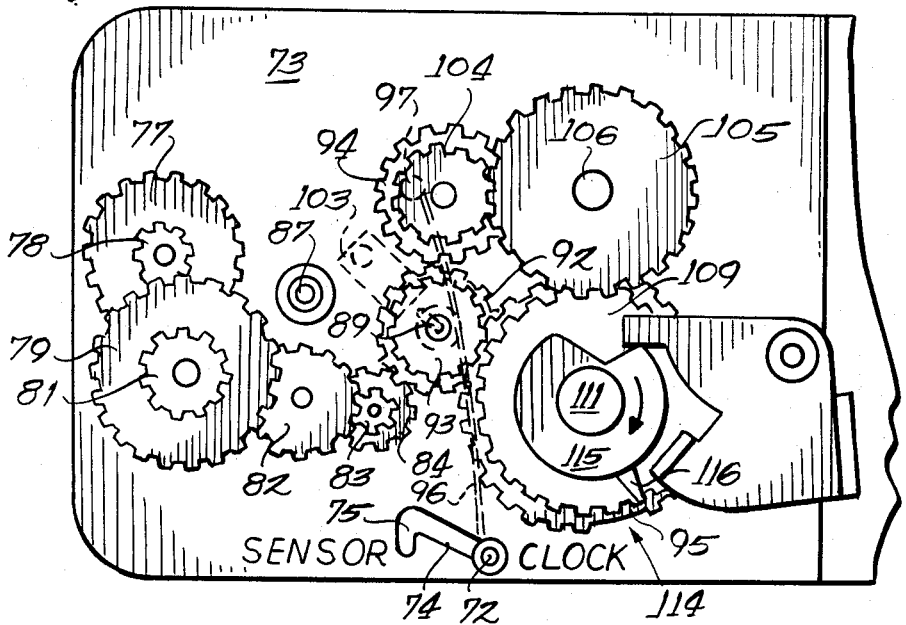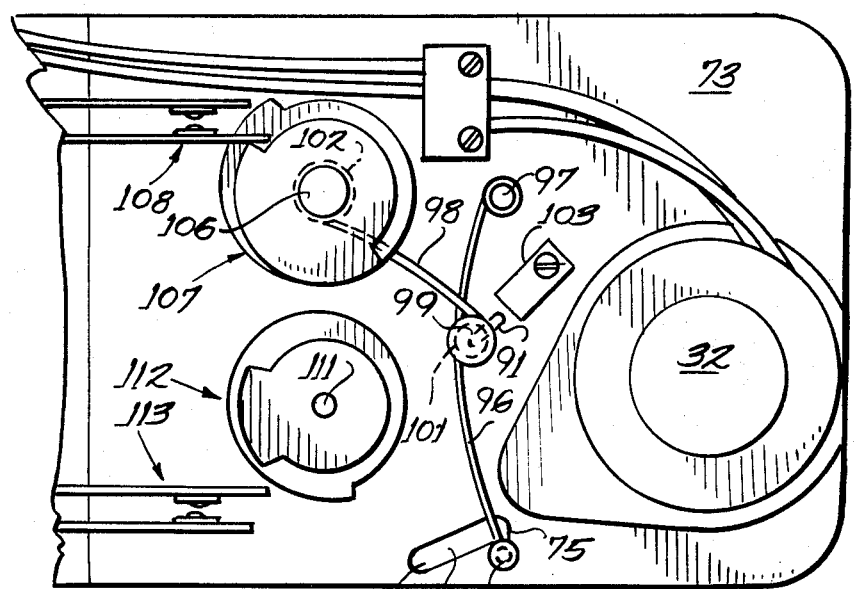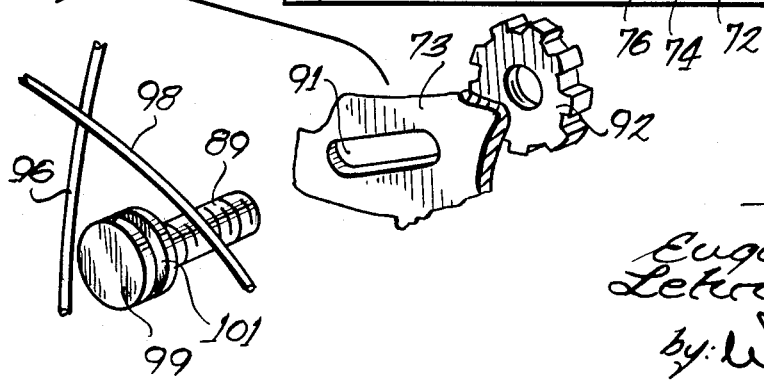

REGENERATION CONTROL AND TIMER SYSTEM

The present invention relates to novel regeneration control and timer system and more particularly to a control system using either a sensor in a water softening tank to indicate exhaustion and initiate regeneration or a timer clock to initiate regeneration at predetermined time intervals.

Presently utilized automatic regeneration control systems for a water conditioning or softening tank rely on a seven day timer with regeneration of the softener being initiated at prescribed time intervals on a weekly basis with the timer interval being based on the hardness of the water being conditioned, the total average gallonage passed through the tank on a daily basis and the conditioning capacity of the material in the tank to a predetermined point of exhaustion. More recently, the use of a sensing probe has come into use which measures the resistance of the conditioning material where a change in the material resistance indicates the exhaustion thereof. However, the sensing probe requires a complicated electric circuit to initiate and control the regeneration operation. The present invention solves the inherent problems of these two known systems for automatic regeneration by combining the timer clock with the sensing probe in a simplified system where the clock and the probe are utilized in the alternative.

Among the objects of the present invention is the provision of a simplified regeneration control and timer system for use on a water conditioning or softening tank where a sensing probe is inserted in the bed of conditioning material in the tank to sense when the conditioning material has reached the point of exhaustion requiring regeneration. An electronic circuit amplifies the signal from the probe to close a relay supplying current to start a timer. The timer operates a series of cams and switches which in turn controls the operation of a control valve for the water softener to provide the steps of backwashing, regenerating and rinsing of the material in the tank. Normally, the material in the tank is an ion exchange resin utilized for softening water and requiring regeneration by contact with a brine solution.

Another object of the present invention is the provision of a regeneration control and timer system having the sensing probe in the water softener tank and a timer clock. The timer can be utilized when the sensor fails to operate properly to provide a regeneration at prescribed time intervals on a daily or weekly basis, and the system includes a switch and a two position lever which are shifted from sensor to timer position depending on the mode of operation for the system.

A further object of the present invention is the provision of a regeneration control and timer system which may be duplexed for a pair of water softeners so that where both softeners utilize the sensing elements, the two softeners cannot be regenerated simultaneously. To duplex the system, two control units, each having a sensing probe and a timer clock, are utilized with a relay in each control unit connected to a similar relay in the other unit. Where one softener has initiated regeneration of the softening material, the other timer on the second softener unit is locked out to prevent regeneration of the second unit until regeneration of the first softener tank has been completed.

Further objects are to provide a construction of maximum simplicity, efficiency, economy and ease of assembly and operation, and such further objects, advantages and capabilities as will later more fully appear and are inherently possessed thereby.

In the Drawings

FIG. 3 is a front elevation view of a regeneration control and timer unit showing the timer clock and the gearing for regeneration control operations.

FIG. 4 is a view similar to FIG. 3 with the timer dial omitted to show the clock gearing arrangement for sensor operation.

FIG. 5 is a view similar to FIG. 4 but showing the gearing arrangement for a timer clock operation.

FIG. 6 is a rear elevational view of the regeneration control unit showing the timer motor and the cams and switches controlling the regeneration operation.

FIG. 7 is an exploded perspective view of the shift arrangement for changing the gearing from sensor to clock operation.

Figure 1:
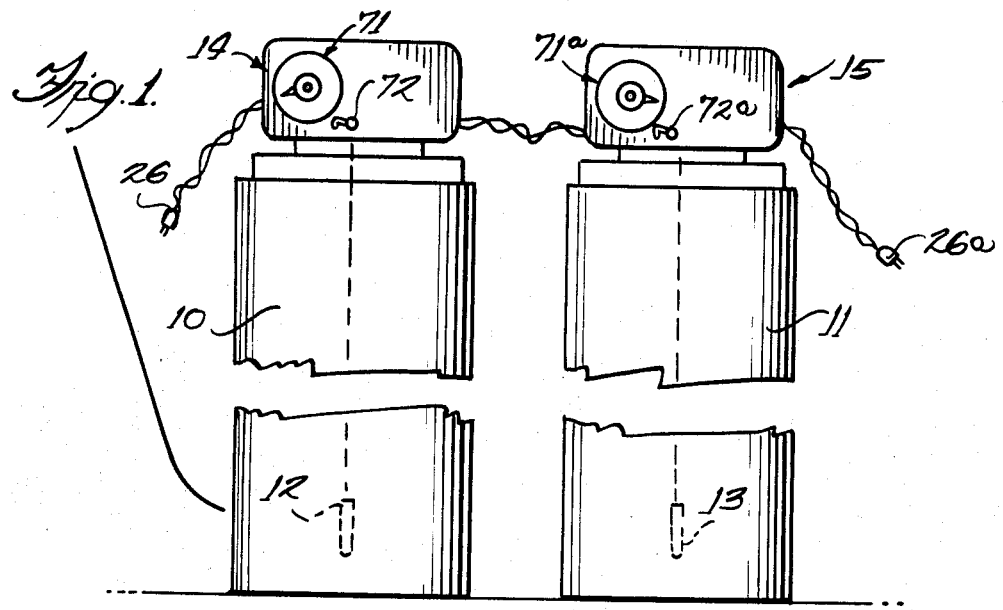
FIG. 1 is a front elevational view on a reduced scale of a pair of water softener tanks, each having a sensing element and a regeneration control and timer unit of the present invention.

Referring more particularly to the disclosure in the drawings wherein is shown an illustrative embodiment of the present invention, FIG. 1 discloses a pair of water softener tanks 10 and 11, each tank having a bed of a suitable ion exchange resin therein and a sensing member or probe 12 or 13 is positioned in the resin bed adjacent the bottom of the tank. Each tank has a control valve (not shown) which has connections to the inlet and outlet of the softener tank, a source of hard water to be treated, a service line directing treated water to a place of use, a source of regenerant for the resin bed, and a drain. Also, a regeneration control and timer unit 14 or 15 is mounted on the softener tanks 10 and 11, respectively.

Each sensing element or probe 12 or 13 is connected to an amplification circuit 16, and a relay 17 is actuated by a signal from the probe. The probe may either be mounted in the tank by a relatively rigid connector or may dangle within the tank; the probe and both methods of attachment being shown and described in the Stanley F. Rak U.S. Pat. No. 3,373,351 issued Mar. 12, 1968 for "Probe to Indicate Resistance Changes in Ion Exchange Material in a Water Softener." The principle of the probe is to provide two pair of sensing electrodes spaced axially on the probe body so as to indicate the change in resistance of the resin bed as the exhaustion level moves downward through the bed. When the exhaustion level reaches the upper pair of electrodes, an imbalance is created between the two pairs of electrodes to trigger a signal to the amplification circuit.

Figure 2:
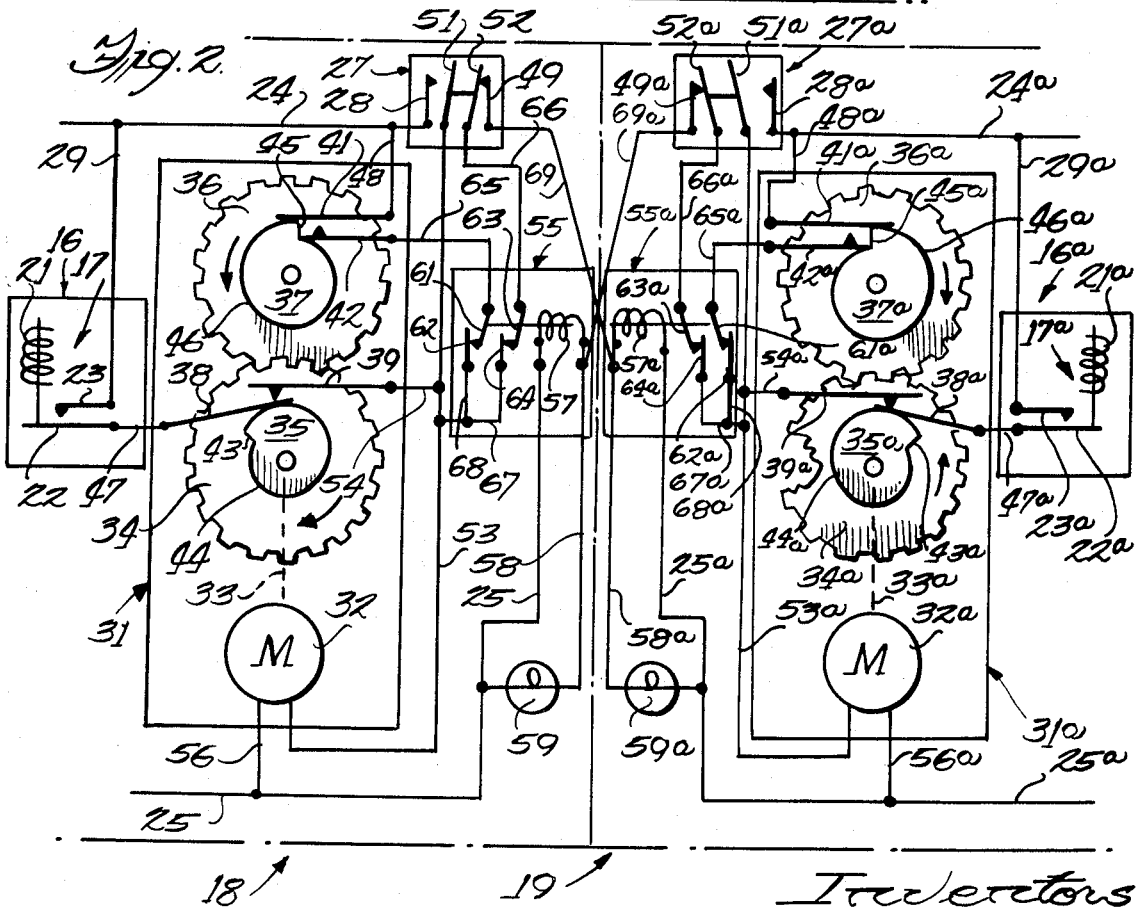
FIG. 2 is a schematic circuit diagram of the regeneration control unit for each water softener unit showing the duplexing arrangement therebetween.

Now considering FIG. 2 wherein a schematic electrical circuit is shown for each regeneration control and for duplexing the control system for the two tanks, the left-hand side of FIG. 2 shows the control circuit 18 for the tank 10 while the right-hand side shows the circuit 19 for the tank 11; both circuits being identical. Considering the single circuit 18 for the tank 10, this circuit includes an amplifier board for the circuit 16 with the relay 17 thereon including a relay coil 21 energized by the signal from the probe 12, a movable arm 22 and a stationary contact 23. A pair of lines 24,25 from a plug 26 provides a source of alternating current for the circuit.

The line 24 leads to a contact 28 of a double-pole switch 27, with a branch line 29 leading to the stationary contact 23 of the relay 17. A timer 31 is also shown having a timer motor 32 with a shaft 33 driving a pair of meshing gears 34 and 36; each gear driving a cam 35 and 37, respectively. Each cam operates a switch with the cam 35 actuating a movable switch arm 38 relative to a stationary contact 39, and the cam 37 actuating a movable switch arm 41 relative to a stationary contact 42. The cam 35 has a drop-off point 43 and a radially outwardly moving camming surface 44 and the cam 37 has a similar drop-off point 45 and camming surface 46.

A line 47 connects the movable relay arm 22 with the movable switch arm 38 while a branch line 48 from the line 24 is connected to the movable switch arm 41. The double-pole switch 27 has a second spaced contact 49 and a pair of simultaneously movable switch arms 51 and 52. A line 53 extends from the arm 51 to the timer motor 32 with a branch line 54 connected to the contact 39 of the cam 35. The main line 25 extends to a second relay 55 with a branch line 56 to the timer motor 32.

The relay 55 includes a relay coil 57 connected at one end to the line 25 and at the other end to a lead 58 for an indicator light 59; the lead 58 intersecting the line 25. The relay coil 57 actuates a pair of movable switch arms 61 and 63 cooperating with switch contacts 62 and 64, respectively, of a double-pole single-throw switch; the arms 61 and 63 normally in engagement with the contacts 62 and 64. A lead 65 connects the contact 42 for the cam 37 with the switch arm 61, while a lead 66 connects the arm 52 of the switch 27 with the switch arm 63. A lead 67 connects the contact 64 with the line 53 and a branch 68 connects to the contact 62.

The circuit 19 is identical with the circuit 18 described above and the identical parts carry the same numeral with a superscript a. To duplex the system for two water softener tanks as shown, a lead 69 interconnects the switch contact 49 with the end of the relay coil 57a connected to the line 58a, and similarly a line 69a interconnects the contact 49a with the end of the coil 57 connected to the line 58.

Each regeneration control and timer unit 14 or 15 has a timer clock dial 71 or 71a, as seen in FIGS. 1 and 3, which is directly driven by the timer motor 32 or 32a, respectively, and operates a series of additional cams and switches operating the control valve for the softener tank by a suitable gearing arrangement, to be later described, with the sensing probe or the timer clock to be used in the alternative depending on the position of the switch 27 or 27a and the position of a shift lever 72 or 72a which are shifted between sensor and clock positions.

Now considering operation of the circuit 18 and/or 19, the tank 10 with the sensing probe 12 and the regeneration control and timer system 14 normally operates utilizing the sensing probe to indicate when the ion exchange resin bed is in a state of exhaustion requiring regeneration. Using the sensing probe 12, the switch 27 is in the position shown with the arm 51 and contact 28 open. For a single softener, only the circuit 18 is considered with the wires The 69a omitted and the relay 55 is always closed or the line 65 may be directly connected to the line 53. The cams 35 and 37 are normally in the position shown with the arm 41 and contact 42 open, the arm 38 and contact 39 closed, and the arm 22 and contact 23 open while the resin is capable of treating the water supply.

As the water is passing downflow through the tank 10 to be removed adjacent the tank bottom by an outlet manifold, the top layers of the resin bed become exhausted first and the level of exhaustion gradually moves downward through the bed until it reaches the probe 12. Where an imbalance in the resistance of the resin occurs as sensed by the probe 12, a signal is provided by the probe and amplified by the amplification circuit 16 in a known manner so as to energize the relay coil 21, which in turn causes the arm 22 to engage the contact 23. Thus, a current flow is completed through lines 24 and 29, contact 23, arm 22, line 47, arm 38, contact 39, lines 54 and 53, timer motor 32 and lines 56 and 25 to energize the motor.

As the motor 32 rotates the shaft 33 and the gears 34 and 36, the cam 37 rotates in a counterclockwise direction so that the switch arm 41 moves off of the camming surface 46 at the drop-off point 45 to engage the contact 42 and completes a holding circuit for the motor 32 through the lines 24 and 48, arm 41, contact 42, line 65, arm 61, contact 62, lines 68,67 and 53, motor 32 and lines 56 and 25. The holding circuit keeps the motor energized through a complete cycle of operation. Shortly after engagement of the arm 41 and contact 42, the cam 35 rotating in the clockwise direction causes the arm 38 to move over the drop-off point 43 to open the engagement between the arm 38 and contact 39 and open the initial motor circuit.

The motor 32 rotates the cams 35 and 37 at a prescribed speed and rotates other cams which control actuation of a control valve for the water softener tank 10 to provide a regeneration cycle of backwashing, brining and rinsing as is well known in the art. As the resin is regenerated, the imbalance in the resin resistance no longer occurs so that the probe 12 no longer sends a signal and the relay coil 21 is deenergized, thus opening the switch arm 22 and contact 23. As the cams 35 and 37 continue to rotate with the camming surface 44 gradually moving the arm 38 up into the engagement with the contact 39 and the camming surface 46 gradually moving the arm 41 upward until engagement with the contact 42 is broken and the motor is deenergized.

If the sensor or probe 12 becomes inoperative due to a mechanical or electrical malfunction, the clock dial 71 can be utilized with regeneration occurring at a predetermined time upon one or more days of the week as will be later described. To switch to a clock operation, the switch 27 is shifted so that arm 51 engages contact 28 and the lever 72 is moved from the sensor to the clock position to be later described. The timer motor 32 is now constantly energized through the circuit of line 24, contact 28, switch arm 51, line 53, motor 32 and lines 56 and 25. The clock dial is properly set to the correct day and hour and the clock will now operate to cause regeneration as later described.

Where two water softener tanks 10 and 11 are utilized together, it is desirable that the regeneration operations of both tanks do not occur at the same time; therefore, the circuits 18 and 19 are duplexed by the addition of the two connecting wires 69,69a, the two relays 55,55a and the indicator lights 59,59a. When both tanks are fully regenerated, the circuits 18 and 19 are in the positions shown in FIG. 2. Assuming that the tank 10 reaches the state of exhaustion first to provide a signal to actuate the relay coil 21, operation of the circuit 18 will proceed as previously described with the cam 37 actuating a holding circuit for the timer motor 32. Also, upon closing of the arm 41 and the contact 42, the relay coil 57a of the relay 55a is energized through the circuit of lines 24 and 48, switch arm 41, contact 42, line 65, arm 61, contact 62, lines 68 and 67, contact 64, arm 63, line 66, arm 52, contact 49, line 69, relay coil 57a and line 25a; the indicator light 59a being energized in parallel with the relay coil 57a.

Energization of the relay coil 57a shifts the switch arms 61a and 63a to open position relative to the contacts 62a and 64a. If the tank 11 now reaches the point of exhaustion to provide a signal from the probe 13 to energize the relay coil 21a, the switch arm 22a is moved into engagement with the contact 23a to complete the circuit through lines 24a and 29a, contact 23a, arm 22a, line 47a, arm 38a, contact 39a, lines 54a and 53a, motor 32a, and lines 56a and 25a to initially energize the motor 32a. The motor rotates the gears 34a and 36a and the cams 35a and 37a so that the arm 41a passes over the drop-off point 45a of cam 37a to engage the contact 42a with the subsequent movement of the arm 38a over the drop-off point 43a on cam 35a to disengage the contact 39a. Under normal circumstances the engagement of arm 41a with contact 42a would provide the holding circuit for the motor 32a; however, with the relay 55a energized, the circuit is open across the arm 61a and contact 62a. Therefore, when the arm 38a disengages the contact 39a, the motor 32a stops.

When the regeneration cycle is completed for the tank 10, the cam 37 causes disengagement of the arm 41 from the contact 42 to stop the motor 32 and to deenergize the relay 55a. When the coil 57a is deenergized, the arms 61a, 63a close with contacts 62a,64a, respectively, with the engagement of arm 61a to the contact 63a completing the circuit through the arm 41a and contact 42a to energize the motor 32a for the regeneration cycle of the tank 11. Also, the engagement of arm 62a with the contact 64a completes the circuit to energize the relay 55 and the indicator light 59, thus preventing a regeneration operation of the tank 10 until the regeneration operation of the tank 11 is completed.

If the probe 12 or 13 is defective or becomes inoperative, the switch 27 or 27a is shifted to its other position and the shift lever 72 or 72a is moved from the sensor to the clock position. Assuming only the sensor 12 is inoperative, the switch 27 is moved to disengage the arm 52 from the contact 49, and the arm 51 engages the contact 28 to complete the circuit of line 24, contact 28, arm 51, line 53, motor 32 and lines 56 and 26 so that the motor operates continuously. By shifting the switch 27, the circuit to the relay 55a is opened so that regeneration of the tank 10 under the timer clock actuation does not affect the regeneration circuit 19. Obviously, the same would apply if the probe 13 were inoperative.

The timer clock mechanism is positioned on the front surface of a partition 73 in the regeneration control and timer unit 14 or 15. Considering the unit 14, the partition includes an inclined slot 74 with a depending end portion 75 at the upper end; the lower end 76 of the slot provides the timer clock position and the portion 75 provides the sensor position for the unit as marked. A series of gears 77,78,79, 81,82,83 and 84 are driven by the timer motor 32 mounted on the rear surface of the partition as seen in FIG. 6. The clock dial 71 has a stationary pointer 85 and a gear 86 on the inner surface engaging the gear 81 of the gear train. The clock dial 71 is rotatable upon a shaft 87 and is marked into seven segments for the 7 days in the week, with each day divided into A.M. and P.M. and into the 12 hours for each division. Adjacent the outer periphery of the dial are provided seven circumferentially equally spaced calendar pins 88; one for each day.

A movable shaft 89 reciprocates in an inclined slot 91 in the partition and carries the gears 92 and 93 thereon. The gear 92 constantly engages the gear 84 of the gear train while the gear 93 is in position for engagement with either the gear 94 or the gear 95. The intermediate gears 92 and 93 are shifted by actuation of the shift lever 72, and an elongated spring 96 has one end mounted in the shift lever 72 and the opposite end is secured to a post 97. A second spring 98 engages a groove 101 in a headed end 99 of the shaft 89 which extends through the slot 91 in the partition and the hubs of the gears 92 and 93 secured thereto; the spring 98 secured to a bearing 102 supporting a shaft 106. A stop 103 limits movement of shaft 89.

The gear 94 is mounted on a shaft to rotate with a smaller gear 104 engaging the gear 105 on a shaft 106. Rotation of the gear 105 and shaft 106 causes rotation of control cams 107 actuating switches 108; the construction and number of cams and switches not forming a part of the present invention. The gear 105 is in engagement with a gear 109 on the shaft 111 carrying the gear 95 and the control cams 112 and switches 113. The shafts 106 and 111 may also carry the cams 35 and 37 of the regeneration control circuit 18. The gear 95 has an arcuate area 114 devoid of gear teeth which normally receives the teeth on the periphery of the gear 93 so that these two gears do not engage.

Also secured to the shaft 111 is a generally circular member 115 and a camming arm or pointer 116 extending beyond the periphery of the member generally aligned with the area 114. When a calendar pin 88 is screwed inward or downward into the dial 71 so that the lower end protrudes on the inner surface of the dial and in the path of the pointer 116. Thus, as the dial 71 rotates, the pin 88 engages and rotates the pointer 116, the member 115 and the gear 95 until the gear teeth on the gear 95 engage the gear teeth on the gear 93 to initiate regeneration cycle.

FIGS. 1 and 2 disclose the timer arrangement for automatic regeneration of the tank 10 by a signal provided by the sensing probe 12. In this arrangement, the switch 27 is in the position shown in FIG. 2 and the shift lever 72 is shown positioned in the depending end 75 of the inclined slot 74. The gears 92 and 93 are shifted so that the gear 92 constantly engages the gear 84 and the gear 93 engages the gear 94. Upon a signal from the probe 12, the timer motor 32 is energized to initiate a regeneration operation with the timer motor 22 rotating the gear train including gear 84, the gears 92,93,94 and 104 to rotate the gears 105 and 109 which rotate the control cams 107 and 112 to actuate the switches 108 and 113 which, in turn, actuate the control valve for the softener 10 to provide a regeneration cycle.

If the probe becomes inoperative, the switch 27 is shifted so the arm 51 engages contact 28 and the lever 72 is moved to the position at the lower end 76 of the inclined slot 74. The switch 27 now provides a direct and constant actuation of the timer motor 32 as previously described. Shifting the lever 72 causes the gear 93 to disengage from the gear 94 and move to a position (FIG. 5) for engagement with the gear 95; the gear 93 normally being positioned opposite the arcuate area 114 of gear 95 devoid of teeth, while the gear 92 remains in engagement with the gear 84. The timer dial 71 is properly set relative to the pointer 116 to the proper day and time and then operates continuously. Where a pin 88 is screwed inwardly so as to engage the pointer 116, the gear 95 will be rotated until the gear 93 engages the teeth on the gear 95 to initiate a regeneration operation; the cycle terminating when the arcuate void area 114 again reaches the gear 93.

When one tank 10 or 11 is operating by its timer clock, the probe operation of the other tank is unaffected. Also, both tanks can be operated on their timer clocks with regeneration occurring on different days if both probes are inoperative. When the probes have been repaired or replaced, the timers can be returned to their sensor positions by shifting the levers 72,72a to the sensor positions and returning the switches 27,27a to the positions shown in FIG. 2. Also all of the calendar pins 88 on the timer dials 71,71a must be disengaged so as not to contact the pointer 116.

Having thus disclosed our invention, we claim:

1. A regeneration control system for first and second water conditioning units providing for regeneration of conditioning material in the units when it has become exhausted comprising a sensor means in each water conditioning unit to signal the stage of exhaustion of the conditioning material, a timer means, a timer circuit means electrically interconnecting each of said sensor means and said timer means said sensor means initiating a signal transmitted through said circuit means to begin regeneration of its respective conditioning unit upon exhaustion of the conditioning material unless the other conditioning unit is being regenerated at that time in which case said circuit means activates said timer means to delay said regeneration a predetermined time so that only one of the two water conditioning units will be regenerated at a time even through both conditioning units reach the point of exhaustion at substantially the same time.

2. A regeneration control system according to claim 17 including a selector switch to cut-out said sensor means and to transfer control of the regeneration of said water conditioning units to said timer means.

3. A regeneration control system according to claim 17 wherein said timer circuit means includes a pair of circuits each having a timer motor, a first control cam and a second control cam simultaneously rotatable by said motor, a normally open switch activated by said first cam and a normally closed switch activated by said second cam, a relay actuated by suitable signalling means indicating a state of exhaustion of one of said water conditioning units, a relay switch activated by said relay, first and second lines leading to a source of power, said first power line being connected to said motor and said second power line being connected to a pole of said normally open switch, a branch line from said second power line to a contact of said relay switch, said movable pole of said relay switch being connected to said contact of said normally closed switch, and a line from said motor connected to said movable poles of said switches, said cams being so arranged that the normally opened switch closes before the normally closed switch opens.

4. A regeneration control system according to claim 19 wherein said timer circuits are duplexed to prevent recurrent regeneration operations.

5. A timer control system for actuation of a regeneration cycle of a water softener, comprising a timer circuit including a timer motor, a first control cam and a second control cam simultaneously rotatable by said motor, a normally open switch actuated by said first cam and a normally closed switch actuated by said second cam, a relay actuated by suitable signalling means indicating a state of exhaustion of said water softener, a relay switch actuated by said relay, and a pair of lines leading to a source of power, one power line being connected to said motor and the other power line being connected to the movable pole of said normally open switch, a branch line from said other power line to the contact of said relay switch, the movable pole of said relay switch being connected to the contact of said normally closed switch, and a line from said motor connected to the movable poles of said switches, said cams being so arranged that the normally open switch closes before the normally closed switch opens, a second relay and second relay switch having a pole connected to said contact of said normally open switch and a contact connected to said line from said motor, a second timer circuit identical to said first timer circuit, said timer circuits being duplexed to prevent concurrent regeneration operations, said second relay switch being a double-pole single-throw switch, a relay coil connected in parallel with an indicator light, said one power line being connected to one end of said coil and to one side of said indicator light, one pole of said relay switch being connected to said contact of the normally open switch, and the second pole being connected to a double-pole selector switch, said contacts of said relay switch being connected together and to said line from said motor.

6. A timer control system as set forth in claim 5, in which said double-pole selector switch of one timer circuit has a first contact connected to said other power line, a first pole connected to said line from said motor, a second pole connected to the second pole of said second relay switch, and a second contact connected to a line leading to the opposite end of the second relay coil of the other timer circuit.

7. A timer control system as set forth in claim 6, in which said selector switches of both timer circuits are positioned with the first pole and contact open and the second pole and contact closed, so that energization of one timer circuit by the closing of the first relay switch will cause energization of the relay coil of the second relay of the other timer circuit to open the normally closed double-pole second relay switch of the other timer circuit and prevent actuation of the timer motor of the other timer circuit and operation of a regeneration cycle.

8. A timer control system as set forth in claim 7, in which said indicator light of the other timer circuit is energized when the second relay coil is energized to indicate that that timer circuit is locked out and, upon actuation of the first relay of the locked out timer circuit, the timer motor of that circuit is actuated for a sufficient length of time to close the normally open switch to provide a holding circuit to energize the timer motor when the relay coil of the second relay of that timer circuit is deenergized.

9. A timer control system as set forth in claim 7, in which said double-pole selector switch of either timer circuit may be shifted to close the first pole and contact and open the second pole and contact if the signalling means for the circuit is defective to provide a continuous timer motor operation.

10. A timer control system for actuation of regeneration cycle of a water softener, comprising a timer circuit including a timer motor, a first control cam and a second control cam simultaneously rotatable by said motor, a normally open switch actuated by said first cam and a normally closed switch actuated by said second cam, a relay actuated by suitable signalling means indicating a state of exhaustion of said water softener, a relay switch actuated by said relay, and a pair of lines leading to a source of power, one power line being connected to said motor and the other power line being connected to the movable pole of said normally open switch, a branch line from said other power line to the contact of said relay switch, the movable pole of said relay switch being connected to the contact of said normally closed switch, and a line from said motor connected to the movable poles of said switches, said cams being so arranged that the normally open switch closes before the normally closed switch opens, a selector switch having a contact connected to said other power line, and a movable pole of the switch directly connected to said motor to provide direct continuous actuation of said motor when said selector switch is closed, a gear train adapted to be rotated by said timer motor, a clock dial operatively connected to said gear train, first and second interengaging gears controlling the actuation of the regeneration cycle, and means to shift from a timer circuit operation to a timer clock operation, a rotatable shaft for each of the first and second interengaging gears, a secondary gear secured to the shaft of the first gear and having an arcuate peripheral area devoid of gear teeth, a third shaft carrying first and second intermediate gears, the second intermediate gear interengaging with said second gear, and said shifting means includes a shiftable gear adapted to engage either said first gear or said first intermediate gear.

11. A timer control system as set forth in claim 10, including a rotatable shaft, said shiftable gear being secured to said shaft, a second shiftable gear secured to said shaft and in constant engagement with said gear train from said clock motor.

12. A timer control system as set forth in claim 11, in which said shifting means also includes a shift lever movable between two positions, a pivotal arm having an elongated slot therein receiving said last mentioned rotatable shaft, an elongated wire spring having one end permanently fixed and the opposite end connected to said shift lever, and a loop intermediate the ends of the wire spring and receiving an end of said rotatable shaft so that movement of said shift lever and wire spring will shift said shaft and shiftable gears between a position engaging said first interengaging gear and a position engaging the first intermediate gear.

13. A timer control means as set forth in claim 12, in which both said shift lever and said selector switch must be shifted from sensor position to clock position to change from an intermittent timer operation to a continuous clock operation.

14. A timer control system as set forth in claim 13, including interengaging means on said clock dial and on said shaft of said first interengaging gear to initiate a regeneration cycle, said first shiftable gear normally having its toothed periphery received in said arcuate area devoid of teeth of said secondary gear.

* * * * *